July 21, 1925.  
E. MONTI  
1,546,669  
APPARATUS FOR CONCENTRATING SOLUTIONS BY FREEZING  
Filed May 27, 1921
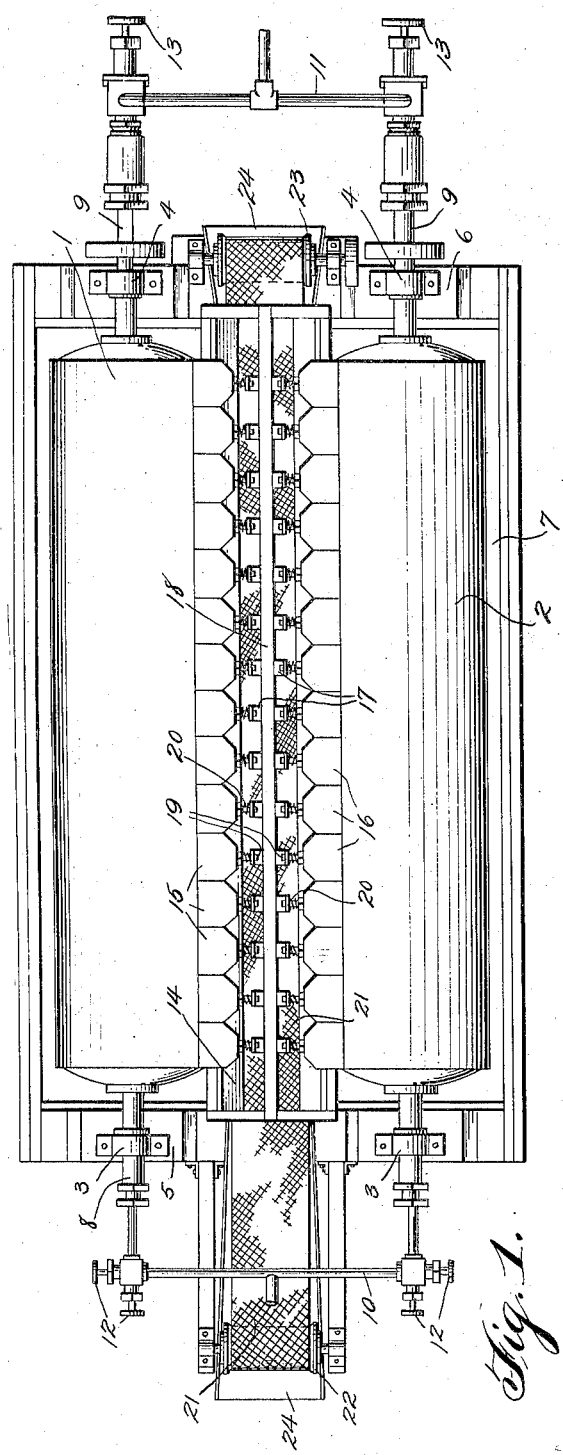
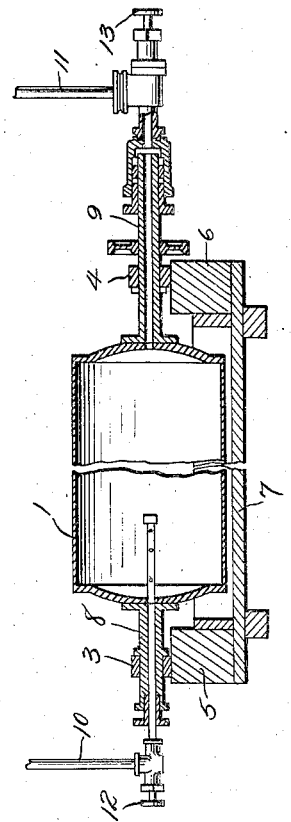
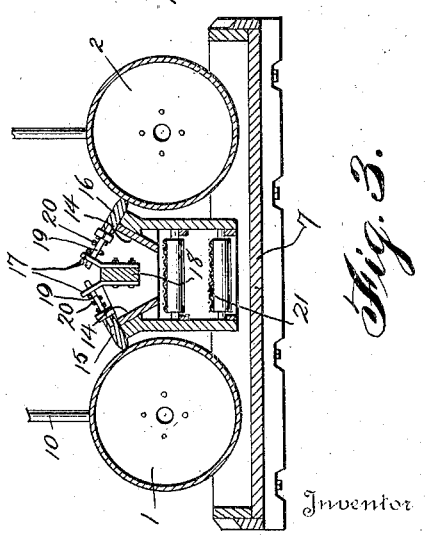

Patented July 21, 1925.

1,546,669

UNITED STATES PATENT OFFICE.

EUDO MONTI, OF ST. LOUIS, MISSOURI.

APPARATUS FOR CONCENTRATING SOLUTIONS BY FREEZING.

Application filed May 27, 1921. Serial No. 473,086.

*To all whom it may concern:*

Be it known that I, EUDO MONTI, a subject of the King of Italy, and a resident of St. Louis, in the county of St. Louis, State of Missouri, have invented certain new and useful Improvements in an Apparatus for Concentrating Solutions by Freezing, of which the following is a specification.

The invention relates to the direct expansion revolving freezer described in my U. S. Patent No. 1,065,829. Reference is also made to my co-pending applications filed October 3, 1916, Serial No. 123,563 and March 28, 1919, Serial No. 285,907 of which the present application is a continuation in part.

The object of the present invention is to improve the construction of certain parts of the apparatus whereby its efficiency will be enhanced and continuous operation will be made possible.

Referring to the accompanying drawings, in which an illustrative embodiment of my invention is shown:

Fig. 1 is a plan view,

Fig. 2 is a vertical longitudinal sectional view of my improved apparatus, and

Fig. 3 is a vertical transverse sectional view of the same.

A pair of freezing drums 1 2 are rotatably mounted in suitable bearings 3—3 4—4 on the ends walls 5—6 of the shallow tank 7. The trunnions 8—9 of the drums are hollow and are connected in pairs by pipes 10—11. By means of a supply pipe from a refrigerating machine (not shown) liquid ammonia or other refrigerant is supplied to the drums by way of the pipe 10 and trunnions 8, evaporating as it enters the drums to produce the desired refrigerating effect and the vapor being drawn off and returned to the compressor at the opposite ends of the drums through the trunnions 9 and pipe 11. Expansion valves 12 13 are provided at convenient points for controlling the supply of refrigerant and regulating the pressure within the drums.

A pair of longitudinal partitions 14 secured to the end walls 5—6 and converging downwardly, form an open bottomed trough between the drums. Two oppositely presented series of scrapers 15 16 are supported adjacent their outer ends by the partitions 14 and at their inner ends by brackets 17 which are secured to a central longitudinal girder 18.

The scrapers consist of wooden blades having rearwardly projecting stems 19 which project loosely through holes in the brackets 17. By means of springs 20 the scrapers 16 are held in yielding contact with the drums. It is an important feature of my invention that the scrapers 15 are presented to the drums in substantially radial planes, this arrangement being far superior to the tangential disposition of the scrapers shown in my Patent No. 1,065,829.

It will be observed that the forward edges of the scrapers form an unbroken line of scraping contact with the drums from end to end. But rearwardly the width of the scrapers is reduced by employing the stems 19 and cutting away the corners of the wooden blades, thus providing openings between the blades through which the mushy sherbet scraped from the drums may fall into the trough formed by the partitions 14. Adjacent the bottom of the trough I provide a screen 21 in the form of an endless perforated belt of any suitable material. This screen or belt 21 is supported on drums 22 23, which latter may be driven so as to impart longitudinal movement to the screen whereby it conveys away from the drums the mushy sherbet scraped therefrom, permitting a portion of the liquid syrup to fall into the tank 7. Any suitable means for receiving the snow-like ice crystals from the screen may be provided as for example, a tank 24 situated beneath the drum 22. Further treatment of the pulpy mass deposited in the tank 24 is sufficiently described in my prior patents (see No. 761,387) and forms no part of the present invention.

The operation of the apparatus is briefly as follows, reference being made to my prior patents for a detailed description of the process of concentrating solutions by freezing carried on by means of the apparatus:

A quantity of solution to be concentrated, for example fruit juice, is run into the tank 7 to a depth sufficient to immerse the drums a few centimeters. By means of driving connections (not shown) the drums are then caused to rotate slowly in the direction of the arrows, the conveying screen 21 is also set in motion and liquid ammonia or other refrigerant is admitted into the interior of the drums. As ice crystals soaked with syrup, form on the outer surface of the drums they will be scraped off by the scrapers 15 and accumulated in the form of a semi-fluid, semi-solid mush on top of the scrapers, and almost liquid, mushy mass being constantly forced rearwardly by fresh accretions of the thick material until it slides through the spaces between the stems 19 into the trough and on to the screen 21. Most of the syrup which it is desired to recover in a concentrated form will fall through the screen into the tank 7, the water being carried off by the screen in the form of snow-like ice crystals together with more or less soluble matter which can be recovered later by the means described in my prior patents.

I claim:

1. An apparatus of the character described, comprising in combination, a tank, a refrigerating drum in the tank, a series of radially presented scrapers forming an unbroken line of scraping contact with the drum, said scrapers being cut away rearwardly to provide openings through which the mushy sherbet scraped from the drum may slide, and a screen for receiving the sherbet and permitting the liquid part of it to fall through into the tank.

2. An apparatus of the character described comprising in combination, a tank, a refrigerating drum in said tank, a scraper bearng against said drum, and a movable screen beneath said scraper for receiving and conveying away the sherbet scraped from the drum, while permitting the liquid part of it to fall through into the tank.

3. An apparatus of the character described comprising in combination a tank, a pair of refrigerating drums in the tank, two series of oppositely presented radial scrapers bearing against said drums respectively, an open bottomed trough beneath said scrapers providing support for the scrapers adjacent said drums, and a traveling screen for receiving and conveying away the sherbet scraped from the drums, while permitting the liquid part of it to fall through into the tank.

4. An apparatus of the character described comprising in combination, a tank, a rotatable refrigerating drum within the tank, and a radially presented scraper bearing against said drum.

5. An apparatus of the character described comprising in combination, a tank, a rotatable refrigerating drum within the tank, and a radially presented scraper yieldably bearing against said drum.

EUDO MONTI.